May 9, 1944.  E. S. AKER  2,348,275
SHAFT JOURNAL
Filed July 28, 1943

INVENTOR.
Evender S. Aker,
BY George D. Richards
Attorney

Patented May 9, 1944

2,348,275

UNITED STATES PATENT OFFICE 2,348,275

SHAFT JOURNAL

Evender S. Aker, Belleville, N. J.

Application July 28, 1943, Serial No. 496,385

9 Claims. (Cl. 308—240)

This invention relates, generally, to improved means for journaling rotatable shafts in their supporting bearings; and the invention has reference, more particularly, to a novel construction of journal device made of non-metallic material, preferably rubber, for rotatably supporting a shaft in its bearing, said journal device being provided with means for delivering lubricating water to and between its bearing face and the opposed surface of the supporting bearing in which it is mounted, whereby the journal device is self-lubricating, and especially adapted to serve a water submerged shaft, such e. g. as the propeller shaft of a power driven boat.

The invention has for an object to provide a novel construction of rubber or similar non-metallic journal device for a shaft provided with means to receive lubricating water and, under centrifugal force developed by the rotation of the shaft and journal device, thereupon to deliver the water through radial discharge passages, formed in the latter, to and between the engaged faces of the same and a cooperating supporting bearing, whereby to constantly subject such face surfaces to water lubrication.

Other objects of this invention, not at this time more particularly enumerated, will be understood from the following detailed description of the same.

Figure 1:
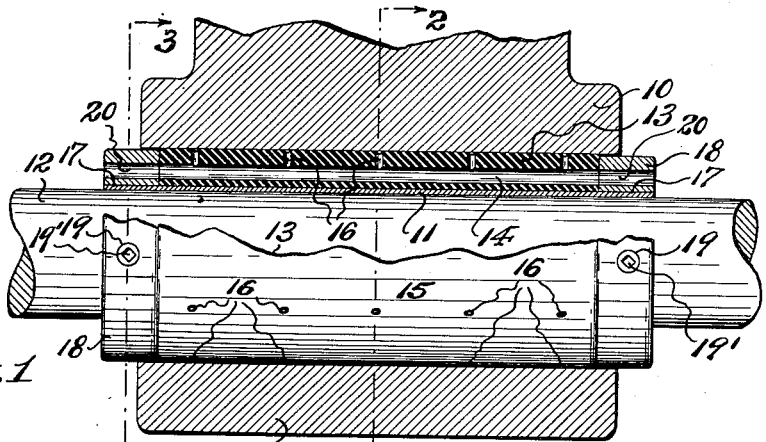
Figures 2, 3:
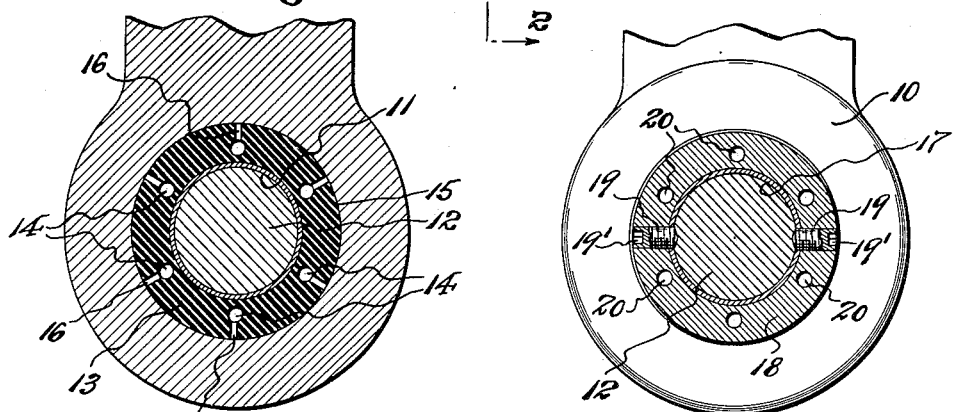

Illustrative embodiments of this invention are shown in the accompanying drawing, in which:

Fig. 1 is in part an elevational view and in part a longitudinal sectional view of one form of journal device according to this invention, and as operatively applied to a shaft for the journaling thereof in a supporting bearing, the bearing being shown in section; Fig. 2 is a transverse sectional view, taken on line 2—2 in Fig. 1; and Fig. 3 is another transverse sectional view, taken on line 3—3 in Fig. 1.

Figure 4:
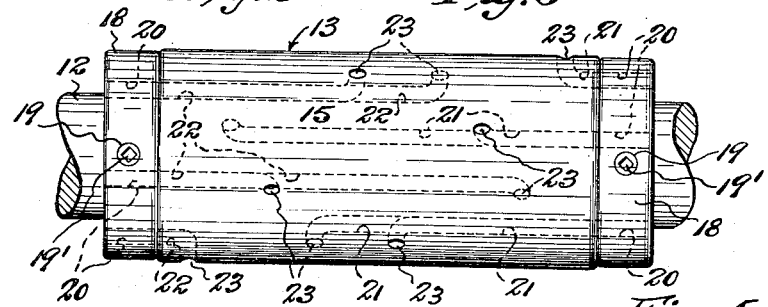
Figure 5:
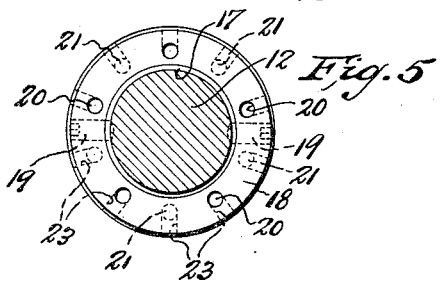

Fig. 4 is an elevational view of a modified form of journal device according to this invention as operatively mounted on a shaft to be served thereby; and Fig. 5 is an end elevational view of said modified journal device, the shaft being shown in cross section.

Similar characters of reference are employed in the above described views, to indicate corresponding parts.

The journal device of this invention is adapted to be used on shafts which are submerged in water, as e. g. the external part of a boat propeller shaft, which is usually supported adjacent to its propeller carrying end by a suitable external bearing 10 which is affixed to the boat stern. It will be understood, however, that the journal device may be employed for machinery shafts of various kinds, especially under conditions where such shafts are operated under wet conditions or wholly or partially submerged in water.

The journal device of this invention comprises a tubular carrier sleeve 11 of rigid material, such as metal; the same having an internal diameter corresponding to the external diameter of a shaft 12 upon which the journal device is to be mounted, whereby to snugly embrace and fit onto the latter.

Mounted on said carrier sleeve 11 is an external cylindrical journal body 13 of substantial wall thickness. Said journal body is made of non-metallic material. For example, the same is preferably made of vulcanized rubber or similar non-metallic material of a character adapted to have its surface frictional resistance substantially reduced when wet. I have found that both hard and soft or comparatively soft vulcanized rubber to be very satisfactory in this respect.

Said journal body 13 is suitably affixed to the carrier sleeve 11; for example, it may be cemented thereto, or, when made of rubber, it may be adhered thereto by vulcanization.

The journal body 13, in one embodiment thereof shown in Figs. 1 and 2, is provided with a series of through passages 14 spaced inwardly from its external bearing surface 15, and extending longitudinally therethrough from end to end thereof. Said passages 14 are circumferentially spaced within the journal body, and may vary in number according to the size of the body. Said passages 14 provide ways for the reception and flow of water through the body interior. Extending outwardly from said water flow passages 14 through the body of the journal device, to emerge at the external bearing surface 15 thereof, are a plurality of radial water delivery passages 16. These delivery passages 16 may be selectively arranged in any suitable manner as to number and grouping, but preferably so as to discharge water therefrom at a multiplicity of symmetrically spaced points at and about the external bearing surface 15 of the journal body, and upon the contiguous surface of the bearing 10 in which the latter is rotatably supported.

Under operative conditions, with the bearing 10 and journal equipped shaft 12 submerged in water, lubricating water will enter, fill and constantly flow through the flow passages 14 from end to end thereof. As the shaft 12 rotates within the bearing 10, the water masses within the flow passages 14 will be subjected to centrifugal force, whereby delivery of water from the latter outwardly through the delivery passages 16 will be induced, and consequently lubricating water will be continuously discharged from the outlets of said delivery passages 16 between and upon the engaged bearing surfaces of the journal body 13 and upon the contiguous surface of the bearing 10 in which said journal body rotates. This action is analogous to a constant pumping action, whereby lubricating water is continuously brought from the interior of the journal body 13 to the exterior bearing surface 15 thereof, so as to spread upon the latter, and thereby form and maintain a lubricating water film which uniformly bathes and lubricates the opposed surfaces of the rotary journal body and the stationary bearing 10.

In a preferred form and construction of the journal device, and to provide means for affixing it to the shaft to be served thereby, the journal body 13 is made of less length than that of the carrier sleeve 11, whereby, when the journal body is mounted on the carrier sleeve as above described, and disposed intermediate the ends of the sleeve, free end portions 17 of the sleeve will project exteriorly beyond the respective ends of said journal body 13. Mounted on and suitably affixed to the projecting free end portions 17 of the carrier sleeve 11 are end collars 18. These collars are preferably made of metallic material, and are of an external diameter substantially corresponding to the external diameter of said journal body; preferably, however, being of slightly less diameter. The journal device, when so made, may be suitably secured to the shaft 12 against both rotational and longitudinal displacement, and so as to rotate with the shaft. An illustrative means for so affixing the journal device to the shaft, as shown in the drawing, comprises one or more set-screws 19 threaded through each collar 18 and through the sleeve end portions 17, so as to bite or grip against the shaft 12. Preferably said set-screws are of the countersinking type, having wrench receiving sockets 19' in their outer ends, engageable by a suitable wrench key for manipulation and tightening home thereof. The collars 18 are provided with through openings or ports 20 corresponding in number and location to the ends of the flow passages 14 of the journal body 13, with which they are registered in communication therewith, when the collars are operatively mounted on the carrier sleeve ends. Said openings or ports 20 provide water entrance and exit ports to admit of water flow through the flow passages of the journal body.

When the shaft 12 is equipped with the journal device above described, and submerged in water, as e. g. when the shaft serves as a submerged boat propeller shaft, the movement thereof through the water, in either forward or sternward direction, will assure entrance of water into the flow passages 14 from the surrounding mass of water in which the shaft is submerged, since said flow passages 14 and the collar openings or ports 20 constitute through passages, open from end to end, and disposed substantially parallel to the direction of either forward or sternward movement of the shaft and journal device through the water.

In Figs. 5 and 6 is shown a somewhat modified form and construction of journal device according to this invention, the same comprising the rigid carrier sleeve 11 and journal body 13 of non-metallic material such as rubber, and equipped, if desired, with the end collars 18 and associated parts as above described. The journal body, however, is provided with a somewhat different form and arrangement of internal water flow passages and communicating discharge passages leading therefrom to the external bearing surface 15 of the journal body. Formed in the interior of the journal body 13 to extend, some from one end thereof and some from the opposite end thereof, are a series of longitudinal water receiving and flow passages 21 extending from said one end, and another series of longitudinal water receiving and flow passages 22 extending from said opposite end. Said flow passages 21 and 22 are circumferentially spaced about the journal body, and may vary in number according to the size of the latter. The flow passages 21 are preferably respectively of different lengths, whereby to terminate within the journal body at different points intermediate the ends of the latter; and, in like manner, the flow passages 22 also are preferably of respectively different lengths, to also terminate within the journal body at different points intermediate its ends. The inner ends of both the flow passages 21 and 22 communicate with radial delivery passages 23, which, by reason of the varied lengths of the flow passages, are relatively spaced to emerge at the external bearing surface 15 of the journal body at a plurality of points, so as to discharge water therefrom at a plurality of spaced points at and about said bearing surface, and upon the contiguous surface of the bearing 10 in which the journal body rotates.

Under operating conditions, wherein the shaft and the thus modified journal body is submerged in water, lubricating water will enter and fill the flow passages 21 and 22. As the shaft rotates within the supporting bearing, the water masses within said flow passages will be subjected to centrifugal force, whereby delivery of water from the latter outwardly through delivery passages 23 will be induced, and consequently lubricating water will be continuously discharged from the outlets of said delivery passages 16 between and upon the engaged bearing surfaces of the journal body and bearing 10; the action being analogous to a pumping action. When the construction includes the collars 18, the openings or ports 20 thereof will be registered with the outwardly open intake ends of the respective flow passages 21 and 22, so as to admit water thereinto.

It will be obvious that various changes, other than those indicated, could be made in the shaft journaling device of this invention without departing from the scope of the latter as defined in the following claims. It is therefore intended that all matter contained in the foregoing description or shown in the accompanying drawing shall be interpreted as illustrative and not in a limiting sense.

I claim:

1. A device for journaling a shaft in a bearing comprising a cylindrical non-metallic journal body of substantial wall thickness surrounding said shaft, said body having water receiving spaces entering the same from an end thereof to extend longitudinally thereinto and spaced inwardly from the external bearing surface thereof, and said body being further provided with radial water delivery passages leading outwardly from said receiving spaces to emerge at said bearing surface, whereby centrifugal force induced by rotation of said shaft and journal body discharges lubricating water from said receiving spaces through said delivery passages onto opposed bearing surfaces of the journal body and the bearing in which it is supported.

2. A device for journaling a shaft in a bearing comprising a cylindrical rubber journal body of substantial wall thickness surrounding said shaft and affixed thereto so as to rotate therewith, said body having water flow passages formed therein, said flow passages entering from an end of said body to extend longitudinally thereof parallel to and spaced beneath the external bearing surface of said body, and said body being further provided with radial water delivery passages leading outwardly from said flow passages to emerge at said bearing surface, whereby centrifugal force induced by rotation of said shaft and journal body discharges lubricating water from said flow passages through said delivery passages onto opposed bearing surfaces of the journal body and the bearing in which it is supported.

3. A device for journaling a shaft in a bearing comprising a rigid tubular carrier sleeve affixed to said shaft in surrounding relation thereto, a cylindrical non-metallic journal body of substantial wall thickness carried by said sleeve, said body having water flow passages entering the same from an end thereof to extend longitudinally thereinto and spaced inwardly from the external bearing surface thereof, and said body being further provided with radial water delivery passages extending outwardly from said water flow passages to emerge at the external bearing surface of said body.

4. A device for journaling a shaft in a bearing comprising a rigid tubular carrier sleeve affixed to said shaft in surrounding relation thereto, a cylindrical rubber journal body of substantial wall thickness carried by said sleeve, said body having longitudinal water receiving passages spaced inwardly from the external bearing surface thereof, and said body being further provided with radial water delivery passages extending outwardly from said water receiving passages to emerge at the external bearing surface of said body.

5. A device for journaling a shaft in a bearing comprising a rigid tubular carrier sleeve affixed to said shaft in surrounding relation thereto, a cylindrical journal body of non-metallic material, such as rubber, affixed to the intermediate portion of said sleeve whereby to provide free end portions of said sleeve projecting beyond the ends of said body, said body being of substantial wall thickness, said body having longitudinal water receiving passages entering the same from an end thereof and spaced inwardly from the external bearing surface thereof, said body being further provided with radial water delivery passages extending outwardly from said receiving passages to emerge at the external bearing surface of said body, collars mounted on said sleeve free end portions in abutment upon the ends of said journal body, said collars having ports therethrough to communicate with outer end openings of the body water receiving passages, and fastening means engaged through said collars and sleeve end portions for affixing the journal device to the shaft.

6. A device for journaling a shaft in a bearing comprising a cylindrical rubber journal body of substantial wall thickness affixed to said shaft, said body having a plurality of circumferentially spaced endwise open longitudinal water flow passages extending from end to end thereof, and said body being further provided with radial water delivery passages leading outwardly therethrough from said water flow passages to emerge at the external bearing surface of said body.

7. A device for journaling a shaft in a bearing comprising a rigid tubular sleeve mounted on said shaft, a cylindrical rubber journal body of substantial wall thickness affixed to the intermediate portion of said sleeve whereby to provide free end portions of said sleeve projecting beyond the ends of said body, said body having a plurality of circumferentially spaced endwise open longitudinal water flow passages extending from end to end thereof, said body being further provided with radial water delivery passages leading outwardly therethrough from said water flow passages to emerge at the external bearing surface of said body, collars mounted on said sleeve free end portions in abutment upon the ends of said journal body, said collars having ports therethrough to communicate with end openings of said water flow passages, and fastening means engaged through said collars and sleeve end portions for affixing the journaling device to the shaft.

8. A device for journaling a shaft in a bearing comprising a cylindrical rubber journal body of substantial wall thickness affixed to said shaft, said body having a plurality of circumferentially spaced longitudinal water receiving passages entering thereinto from the body ends, some from one end and others from the opposite end, and said body being further provided with radial water delivery passages leading outwardly therethrough from interior portions of said receiving passages to emerge at the external bearing surface of said body.

9. A device for journaling a shaft in a bearing comprising a rigid tubular carrier sleeve mounted on said shaft, a cylindrical rubber journal body of substantial wall thickness affixed to the intermediate portion of said sleeve whereby to provide free end portions of said sleeve projecting beyond the ends of said body, said body having a plurality of circumferentially spaced longitudinal water receiving passages entering thereinto from the body ends, some from one end and others from the opposite end, said body being further provided with radial water delivery passages leading outwardly therethrough from interior portions of said receiving passages to emerge at the external bearing surface of said body, collars mounted on said sleeve free end portions in abutment upon the ends of said journal body, said collars having ports therethrough to communicate with the water receiving passages entering the journal body end adjacent thereto, and fastening means engaged through said collars and sleeve end portions for affixing the journaling device to the shaft.

EVENDER S. AKER.